United States Patent Office 3,457,262
Patented July 22, 1969

3,457,262
3-METHYL-5-ISOPROPYLPHENYL ESTERS OF N-PYRROLIDINO AND N-MORPHOLINO CARBOXYLIC ACIDS
Horst Peissker, Wolfenbuttel, and Armin Kutzsche, Darmstadt, Germany, and Mahmoud Muftic, Cornavin, Genf, Switzerland, assignors to Schering A.G., Berlin, Germany
No Drawing. Filed Feb. 20, 1967, Ser. No. 617,082
Claims priority, application Germany, Mar. 2, 1966, Sch 38,577
Int. Cl. C07d 27/04, 87/36; A61k 27/00
U.S. Cl. 260—247.2     3 Claims

ABSTRACT OF THE DISCLOSURE 3-methyl-5-isopropylphenyl esters of N-pyrrolidino and N-morpholino carboxylic acids as dermatological fungicides and also as tranquilizers.

---

This invention relates to novel esters of N-pyrrolidino and N-morpholino carboxylic acids and, in particular, to the use of such compounds as dermatological agents and tranquilizers.

Heretofore, no pharmaceutical agent had been described which possessed a definite effectiveness—when used topically—against dermatophytes of all types. Because of this void in the medical armamentarium, particular difficulties have been encountered in the treatment of highly refractory and painful inflammations at toenails and fingernails caused by certain fungi, such as, for example, onychomycoses. Previously, such inflammations could be treated only by surgery or by radiation.

It is thus an object of this invention to provide novel compounds suitable for the treatment of inflammations caused by dermatophytes.

Another object is to provide novel compounds suitable as tranquilizing agents.

A further object is to provide pharmaceutical compositions in topical form comprising the novel compounds of this invention.

Still another object is to provide fungicidal compositions.

A still further object is to provide methods of administering the novel agents of this invention for the treatment of infections caused by dermatophytes.

Upon further study of the specification and claims, other objects and advantages of the present invention will become apparent.

For the attainment of these objects, it has now been discovered that the previously unknown 3-methyl-5-isopropylphenyl esters of (a) N-pyrrolidino carboxylic acid or of (b) N-morpholino carboxylic acid are efficacious against dermatophytes, the former compound being particularly excellent.

The following Table I discloses a list of the minimum total inhibition dosages determined by the plate dilution test, in comparison to griseofulvin, with respect to a wide variety of specific dermatophytes.

TABLE I

[Inhibition dosage in γ (micrograms) per milliliter]

| Dermatophytes | Griseofulvin | 3-methyl-5-isopropylphenyl ester of— | |
|---|---|---|---|
| | | Pyrrolidino | Morpholino |
| | | N-carboxylic acid | |
| Trich. megninii M 39 A | 10 | 1 | |
| Trich. ferrugineum M 39 C | >100 | 5 | |
| Trich. tonsurans M 39 E | 100 | 5 | 3 |
| Trich. tonsurans M 39 F | | 50 | |
| Trich. rubrum M 41 B | >100 | 1 | 3 |
| Trich. rubrum M 41 C | 50 | 5 | |
| Trich. mentagrophytes M 41 D | >100 | 5 | |
| Trich. mentagrophytes M 41 E | >100 | 5 | 3 |
| Trich. quinckeanum M 41 F | 100 | 25 | |
| Trich. mentagrophytes M 41 G | >100 | 1 | |
| Trich. verrucosum alb. M 43 B | 25 | 5 | |
| Trich. verrucosum disc. M 43 C | 10 | 5 | |
| Trich. asteroides M 43 D | >100 | 25 | |
| Trich. granulosum M 43 E | 100 | 5 | |
| Trich. granulosum Ballagi M 43 F | >100 | 5 | |
| Epid. floccosum M 51 A | 100 | 5 | 3 |
| Epid. floccosum M 51 B | | 5 | |
| Micr. canis M 55 B | 100 | 5 | |
| Micr. gypseum M 55 E | 100 | 5 | 30 |
| Micr. gypseum M 55 F | 50 | 10 | |
| Micr. canis M 55 G | >100 | 10 | |

Of further importance is the relatively low toxicity of the compounds of this invention as compared to griseofulvin. With griseofulvin, the peroral $LD_{50}$ is 6 g. while the subcutaneous $LD_{50}$ in case of the 3-methyl-5-isopropylphenyl ester of pyrrolidino-N-carboxylic acid is >8 g. and the peroral $LD_{50}$ is 4.3 g. These $LD_{50}$ tests were conducted on mice by the conventional method, such as outlined in L. Hepding et al. Arzneimittelforschung 10, 440 (1960).

The compounds of this invention are also efficacious tranquilizers.

The compounds can be produced by standard esterification techniques. For example, either an acid chloride of the general formula:

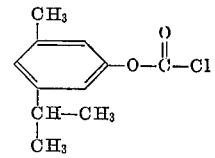

or a functional derivative of the corresponding acid, can be reacted with pyrrolidine or morpholine, optionally in the presence of an acid-neutralizing agent.

Alternatively, an acid chloride of the general formula:

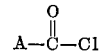

wherein
A represents the pyrrolidino or morpholino residue, or a functional derivative of the corresponding acid, is reacted in an equivalent manner, with 3-methyl-5-isopropylphenol, again in the optional presence of an acid-neutralizing agent.

The starting material 3-methyl-5-isopropylphenol is described in Arch. pharm. No. 289, page 719 (1956).

Suitable solvents for the production of the esters or amides are preferably aromatic hydrocarbons, such as benzene or toluene. The reaction occurs readily at 10–40° C. with yields of above 90%.

The substances of this invention are suitable for the treatment of mycoses of the most varied types, such as, for example, interdigital mycoses, nail bed mycoses, and epidermatophytoses.

For this use, the novel esters of this invention are preferably employed as topical preparations. For example, they can be incorporated into conventional bases employed for the formulation of ointments, salves, creams, pastes, solutions, emulsions, and the like. Generally, the physical form of such formulations is viscous to semi-solid. All common carriers, excipients and additives can be combined therewith, such as fats, saturated and unsaturated fatty acids, higher alcohols, waxes, aliphatic hydrocarbons, aromatic carboxylic acids, glycols, such as glycerol, propylene glycol or polyethylene glycols, wool wax, wool wax alcohols, ionic and non-ionic emulsifiers or detergents, volatile oils, odorants, analgesics, anti-inflammatory compounds, etc.

In general, the pharmaceutical preparations according to this invention contain about 0.1 to 100% by weight, preferably 1–10% of the active ingredient. Of course, other active compounds can be added, such as bactericides, if desired, if they are compatible with the novel esters of this invention.

Furthermore, the novel esters can be employed as antiseptic solutions to kill or inhibit the growth of fungi. For example, they can be used in the washing of blankets and linen, in the application to gauze, surgical instruments, and the like. Such solutions can also be used in vitro as well as in vivo, and usually contain about 0.1 to 100 preferably 1–10 of the active ingredient. These solutions can have thinner carriers, such as water, alcohol, and the like.

When employed as tranquilizers, the esters of this invention can be employed with conventional pharmaceutical excipients. Carrier substances can be such organic or inorganic compounds suitable for parenteral or enteral application, and which do not react with the novel compounds, such as, for example, water, vegetable oils, polyethylene glycols, lactose, amylose, magnesium stearate, talc, etc. For parenteral applications, particularly oily or aqueous solutions, as well as suspensions, emulsions, or implants are employed.

For enteral application, furthermore, suitable are tablets or dragees which are also characterized by the presence of a carbohydrate carrier or binder. A syrup or the like can also be used wherein a sweetened vehicle is employed.

In such cases, the novel esters are preferably administered in dosages of 1 g. per kg. body weight.

For all the above cases, the novel esters can be administered to mammals, in general.

Without further elaboration, it is believed that one skilled in the art can, using the preceding description, utilize the present invention to its fullest extent. The following preferred specific embodiments are, therefore, to be construed as merely illustratvie, and not limitative of the remainder of the specification and claims in any way whatsoever.

Example 1

To a solution of 37.0 g. (0.52 mol) pyrrolidine in 150 ml. toluene there are added dropwise under stirring at +10 to +15° C., within 30 minutes, 53.1 g. (0.25 mol) of the 3-methyl-5-isopropylphenyl ester of chloroformic acid. The reaction mixture is stirred for another 30 minutes at room temperature, and then the reaction solution is removed from the crystallized pyrrolidine hydrochloride by vacuum filtering. Thereafter, the solution is washed successively with ice water, dilute hydrochloric acid, and $NaHCO_3$ solution. After drying with $Na_2SO_4$, the reaction mixture is evaporated under vacuum. Yield: 57.1 g.=92.5% of theory of the 3-methyl-5-isopropylphenyl ester of pyrrolidino-N-carboxylic acid.

Properties.—The ester exhibits good solubility in organic solvents; it is insoluble in water.

B.P. $_{0.09}$=146° C., $n_D^{20}$=1.5250.

Example 2

The sodium salt, produced from 15.0 g. (0.1 mol) 3-methyl-5-isopropylphenol is suspended in 100 ml. benzene. Under stirring, there are added dropwise within 15 minutes, 13.4 g. (0.1 mol) pyrrolidino-N-carboxylic acid chloride, the temperature increasing from 25° C. to 40° C. The reaction mixture is additionally stirred for 1 hour at room temperature; then, with the addition of ice, it is washed successively with dilute sodium hydroxide solution, dilute hydrochloric acid, and $NaHCO_3$ solution. After drying with $Na_2SO_4$, the reaction solution is evaporated under vacuum. Yield: 23.3 g.=94.6% of theory, of the 3-methyl-5-isopropylphenyl ester of pyrrolidino-N-carboxylic acid.

Example 3

To a solution of 50.0 g. (0.153 mol) of bis-(3-methyl-5-isopropylphenyl)-carbonate, produced by reacting the 3-methyl-5-isopropylphenyl ester of chloroformic acid with the sodium salt of 3-methyl-5-isopropylphenol, in 50 ml. benzene, there is added dropwise within 30 minutes a solution of 10.9 g. (0.153 mol) of pyrrolidine in 25 ml. benzene, the temperature increasing from 25° C. to 40° C. After 1 hour, the reaction solution is washed successively, with the addition of ice, with dilute sodium hydroxide solution, dilute hydrochloric acid, and water. Then, the mixture is dried with $Na_2SO_4$ and evaporated under vacuum. Yield: 35.2 g.=93.3% of theory, of the 3-methyl-5-isopropylphenyl ester of pyrrolidino-N-carboxylic acid.

Example 4

When reacting morpholine with the 3-methyl-5-isopropylphenyl ester of chloroformic acid, according to Example 1, the 3-methyl-5-isopropylphenyl ester of morpholino-N-carboxylic acid is obtained in a yield of 92% M.P. 52–53° C. (from petroleum ether).

Example 5

5 g. of the 3-methyl-5-isopropylphenyl ester of pyrrolidino-N-carboxylic acid are taken up in 12 g. paraffin (liquid, DAB 6) and worked up into a salve in a conventional manner with 5 g. of beeswax (white, DAB 6), 5 g. lanolin (anhydrous, DAB 6), 19.98 g. Vaseline (white, DAB 6), 25 g. amphocerin K "Dehydag," 28 g. water (desalted), and 0.02 g. chypre No. 6466 "Haarmann und Reimer."

Example 6

For producing a solution, 5 parts of pyrrolidino-N-carboxylic acid 3-methyl-5-isopropylphenyl ester (or 5 parts of morpholino-N-carboxylic acid 3-methyl-5-isopropylphenyl ester) are taken up either in a mixture of 47.5 parts of phenol and 47.5 parts of camphor, or in a mixture of 47.5 parts of oleic acid oleyl ester and 47.5 parts of isopropanol.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound selected from the group consisting of the 3-methyl-5-isopropylphenyl ester of pyrrolidino-N-carboxylic acid and the 3-methyl-5-isopropylphenyl ester of morpholino-N-carboxylic acid.

2. 3-methyl-5-isopropylphenyl ester of pyrrolidino-N-carboxylic acid.

3. 3-methyl-5-isopropylphenyl ester of morpholino-N-carboxylic acid.

References Cited

Alan J. Lemin, Chemical Abstracts, vol. 59, pp. 12, 708–09 (1963).

ALEX MAZEL, Primary Examiner

JOSE TOVAR, Assistant Examiner

U.S. Cl. X.R.

260—326.3; 424—248, 274